United States Patent
Ju et al.

(10) Patent No.: US 12,347,243 B2
(45) Date of Patent: Jul. 1, 2025

(54) METHOD AND SYSTEM FOR REPLACING VEHICLE PARTS USING IN-VEHICLE NETWORK BASED ON VEHICLE ETHERNET

(71) Applicant: ELECTRONICS AND TELECOMMUNICATIONS RESEARCH INSTITUTE, Daejeon (KR)

(72) Inventors: Hong-Il Ju, Daejeon (KR); Dong-Wook Kang, Daejeon (KR); Dae-Won Kim, Daejeon (KR); Sang-Woo Lee, Daejeon (KR); Jin-Yong Lee, Daejeon (KR); Boo-Sun Jeon, Daejeon (KR); Bo-Heung Chung, Daejeon (KR); Byeong-Cheol Choi, Daejeon (KR); Joong-Yong Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 912 days.

(21) Appl. No.: 16/952,856

(22) Filed: Nov. 19, 2020

(65) Prior Publication Data

US 2021/0174607 A1 Jun. 10, 2021

(30) Foreign Application Priority Data

Dec. 10, 2019 (KR) .................. 10-2019-0164118

(51) Int. Cl.
*H04L 9/32* (2006.01)
*B60S 5/00* (2006.01)
(Continued)

(52) U.S. Cl.
CPC ................ *G07C 5/008* (2013.01); *B60S 5/00* (2013.01); *G06F 21/64* (2013.01); *G07C 5/0808* (2013.01);
(Continued)

(58) Field of Classification Search
CPC ....... G07C 5/008; G07C 5/0808; G06F 21/64; G06F 2221/2129; G06F 21/44;
(Continued)

(56) References Cited

U.S. PATENT DOCUMENTS 9,644,591 B2 5/2017 Choi et al.
10,355,868 B2 7/2019 Cho et al.
(Continued)

FOREIGN PATENT DOCUMENTS

JP 2013-141947 7/2013
JP 2017-79369 4/2017
(Continued)

*Primary Examiner* — Fadey S. Jabr
*Assistant Examiner* — Michael J Herrera
(74) *Attorney, Agent, or Firm* — KILE PARK REED & HOUTTEMAN PLLC

(57) ABSTRACT

Disclosed herein are a method for replacing vehicle parts using an in-vehicle network based on an automotive Ethernet and a system for the same. The method is configured such that a vehicle diagnosis module included in a vehicle performs vehicle self-diagnosis, such that the vehicle and a vehicle manufacturer server perform an authentication process for a new part when a vehicle part is replaced based on a vehicle part replacement agreement procedure between the terminal of a vehicle owner and the maintenance terminal of a vehicle maintenance company, and such that the terminal of the vehicle owner checks whether replacement of the vehicle part is performed normally by requesting an integrity check result from each of the vehicle and the vehicle manufacturer server when the maintenance terminal trans- (Continued)

mits a part replacement completion message to the terminal of the vehicle owner after completion of the authentication process.

3 Claims, 8 Drawing Sheets

(51) Int. Cl.
    *G06F 21/64*      (2013.01)
    *G07C 5/00*      (2006.01)
    *G07C 5/08*      (2006.01)
    *H04L 9/08*      (2006.01)
    *H04L 9/30*      (2006.01)

(52) U.S. Cl.
    CPC .............. *H04L 9/0891* (2013.01); *H04L 9/30* (2013.01); *H04L 9/3247* (2013.01)

(58) Field of Classification Search
    CPC ... G06F 21/57; H04L 2209/84; H04L 9/0825; H04L 9/0891; H04L 63/12; H04L 9/30; H04L 9/3247; G06Q 50/30; G06Q 10/20; B60S 5/00
    See application file for complete search history.

(56) References Cited

U.S. PATENT DOCUMENTS

| | | | |
|---|---|---|---|
| 10,484,184 | B2 | 11/2019 | Oguma et al. |
| 2003/0028297 | A1* | 2/2003 | Lihoshi .................. G07C 5/008 701/29.6 |
| 2004/0268124 | A1* | 12/2004 | Narayanan ............ H04L 63/102 713/164 |
| 2015/0180840 | A1* | 6/2015 | Jung ..................... H04L 9/3247 713/150 |
| 2019/0281052 | A1* | 9/2019 | Lekkas ..................... H04L 9/14 |
| 2019/0312892 | A1 | 10/2019 | Chung et al. |
| 2020/0043256 | A1* | 2/2020 | Rocci .................. G06F 11/3664 |
| 2021/0165869 | A1* | 6/2021 | Unagami ............... G05B 15/02 |
| 2022/0124086 | A1* | 4/2022 | Gao ..................... H04L 63/0876 |

FOREIGN PATENT DOCUMENTS

| | | |
|---|---|---|
| JP | 2019-29988 | 2/2019 |
| KR | 10-2014-0146718 | 12/2014 |
| KR | 10-1593674 | 2/2016 |
| KR | 10-2017-0129494 | 11/2017 |
| KR | 10-2018-0049455 | 5/2018 |
| KR | 10-2019-0072009 | 6/2019 |
| KR | 10-2019-0078154 | 7/2019 |

* cited by examiner

METHOD AND SYSTEM FOR REPLACING VEHICLE PARTS USING IN-VEHICLE NETWORK BASED ON VEHICLE ETHERNET

CROSS REFERENCE TO RELATED APPLICATION

This application claims the benefit of Korean Patent Application No. 10-2019-0164118, filed Dec. 10, 2019, which is hereby incorporated by reference in its entirety into this application.

BACKGROUND OF THE INVENTION

1. Technical Field

The present invention relates generally to technology for securely replacing vehicle parts, and more particularly to technology for enabling a vehicle owner, a vehicle manufacturer, a vehicle maintenance company, and a vehicle to securely replace an electronic control unit (ECU) using existing IT technology when replacement of the ECU is required due to failure thereof in a vehicle in which an in-vehicle network is configured based on an automotive Ethernet.

2. Description of the Related Art

With the recent advent of technologies such as autonomous driving, a connected car, and the like, vehicles increasingly adopt IT technology, which results in increasing attention being paid to fields related to vehicle security technology.

For example, provision of new services, such as autonomous driving and connected cars, requires technology for quickly transmitting a large amount of data, and in order to satisfy this requirement, an automotive Ethernet is adopted not only in a network outside a vehicle but also in an in-vehicle network. That is, in the IoT environment, in which all things are connected over the Internet, vehicles are necessarily placed in an environment in which the vehicles must frequently perform communication via external networks. However, when IT technology is increasingly applied to vehicles, security threats present in the existing IT technology also appear in vehicles, so security threats to vehicles are expected to increase.

In order to respond to such security threats to vehicles, security solutions for external networks of vehicles have been actively researched, but analysis of security threats to in-vehicle networks to which an automotive Ethernet is applied and research into security solutions therefor are not being actively conducted. As the most fundamental security function for in-vehicle networks, a secure communication function must be provided, and to this end, secure key management must also be provided.

Also, in the event of replacement of an ECU due to a problem in a vehicle, the owner of the vehicle has to date been unable to check whether the ECU is replaced with a certified ECU and has had no choice but to trust the results of repair and replacement provided by a vehicle maintenance company. That is, there may be a problem in which, if the vehicle maintenance company replaces the ECU regardless of the inspection result, or if the vehicle maintenance company illicitly replaces an ECU, which needs to be replaced according to the inspection result, with an uncertified ECU, the owner of the vehicle cannot detect this situation.

Also, when replacement of the ECU of a vehicle having a problem is entrusted to a vehicle maintenance company, critical data (key information, sensitive information, and the like) included in the ECU can be exposed by the vehicle maintenance company. Further, because most in-vehicle networks are configured such that ECUs connected with the same domain (the same vehicle gateway) use the same secret key when security functions are applied, leakage of the secret key of one of the ECUs may result in security threats to all of the ECUs connected to the domain.

DOCUMENTS OF RELATED ART (Patent Document 1) Korean Patent Application Publication No. 10-2019-0072009, published on Jun. 25, 2019 and titled "Method for programming electronic control unit using vehicle diagnostic system"

SUMMARY OF THE INVENTION

An object of the present invention is to provide a system for more securely repairing a vehicle and replacing vehicle parts by applying IT technology to a process in which a vehicle maintenance company carefully inspects and repairs the vehicle.

Another object of the present invention is to prevent installation of an uncertified part in a vehicle through the process of registering a certified genuine part, which is performed between a vehicle manufacturer and a vehicle part manufacturer, thereby fundamentally preventing the uncertified vehicle part from being connected with the vehicle.

A further object of the present invention is to provide a vehicle part replacement method that can be trusted by a vehicle owner by enabling the vehicle owner to check information about a new vehicle part (ECU), with which an old vehicle part is replaced, and to additionally check the result of replacement again.

Yet another object of the present invention is to minimize a key management burden imposed on a domain gateway by forcing ECUs connected with the same domain in a vehicle to use the same session key (secret key).

Still another of the present invention is to construct a secure communication channel in a vehicle using a session key that is based on an initial session key and is updated each time communication is required, the initial session key being generated when an ECU is registered or when a new ECU to replace an old ECU is registered.

In order to accomplish the above objects, a method for replacing vehicle parts according to the present invention includes performing, by a vehicle diagnosis module included in a vehicle, vehicle self-diagnosis in response to a request made through the terminal of a vehicle owner; performing, by the vehicle and a vehicle manufacturer server, an authentication process for a new part with which a vehicle part is replaced when the vehicle part is replaced depending on the result of the vehicle self-diagnosis based on a vehicle part replacement agreement procedure between the terminal of the vehicle owner and the maintenance terminal of a vehicle maintenance company; and checking, by the terminal of the vehicle owner, whether replacement of the vehicle part is performed normally by requesting an integrity check result from each of the vehicle and the vehicle manufacturer server when the maintenance terminal transmits a part replacement completion message to the terminal of the vehicle owner after the authentication process is completed.

Here, the method may further include registering, by the vehicle, at least one domain gateway included in the vehicle in the vehicle manufacturer server.

Here, registering the at least one domain gateway may include transmitting, by the vehicle, the public key and signature value of each of the at least one domain gateway to the vehicle manufacturer server; authenticating, by the vehicle manufacturer server, the at least one domain gateway based on the signature value thereof, and transmitting, by the vehicle manufacturer server, a session key encrypted with the public key of the at least one domain gateway to the vehicle when authentication is completed; and decrypting and storing, by the vehicle, the session key, and requesting and receiving, by the vehicle, a security policy from the vehicle manufacturer server.

Here, the vehicle part replacement agreement procedure may include a process in which the maintenance terminal requests the vehicle diagnosis module to perform detailed inspection of the vehicle in response to a request from the terminal of the vehicle owner for inspection of the vehicle and a process in which the maintenance terminal asks the terminal of the vehicle owner whether to replace the vehicle part depending on the result of the detailed inspection of the vehicle.

Here, performing the authentication process may include transmitting, by the vehicle, the public key and signature value of the new part to the vehicle manufacturer server; and performing, by the vehicle manufacturer server, authentication of the new part based on the signature value of the new part.

Here, the method may further include encrypting, by the vehicle manufacturer server, identification information of the new part with the session key and transmitting, by the vehicle manufacturer server, the encrypted identification information to the vehicle along with the public key of the new part; updating, by the vehicle, the session key based on the identification information of the new part, encrypting, by the vehicle, the updated session key with the public key of the new part, and transmitting, by the vehicle, the encrypted session key, to the new part; and encrypting, by the vehicle, a security policy stored in the at least one domain gateway with the updated session key and transmitting, by the vehicle, the encrypted security policy to the new part.

Here, checking whether the replacement of the vehicle part is performed normally may be configured such that the terminal of the vehicle owner checks the integrity check result by comparing a first integrity value received from the vehicle with a second integrity value received from the vehicle manufacturer server.

Here, the first integrity value may be acquired in such a way that the terminal of the vehicle owner again requests the vehicle diagnosis module to perform vehicle self-diagnosis after receiving the part replacement completion message, and the second integrity value may be acquired in such a way that the terminal of the vehicle owner requests the result of authentication of the new part from the vehicle manufacturer server after receiving the part replacement completion message.

Also, a system for replacing vehicle parts according to an embodiment of the present invention includes a vehicle performing vehicle self-diagnosis based on a vehicle diagnosis module included in the vehicle; the terminal of a vehicle owner for requesting the vehicle to perform the vehicle self-diagnosis; the maintenance terminal of a vehicle maintenance company for inspecting the vehicle and replacing a vehicle part in response to a request from the terminal of the vehicle owner; and a vehicle manufacturer server for performing an authentication process for a new part with which the vehicle part is replaced based on communication of the vehicle when the vehicle part is replaced depending on the result of the vehicle self-diagnosis based on a vehicle part replacement agreement procedure between the terminal of the vehicle owner and the maintenance terminal. The terminal of the vehicle owner checks whether replacement of the vehicle part is performed normally by requesting an integrity check result from each of the vehicle and the vehicle manufacturer server when the terminal of the vehicle owner receives a part replacement completion message from the maintenance terminal after completion of the authentication process.

Here, the vehicle may register at least one domain gateway included therein in the vehicle manufacturer server.

Here, when the vehicle transmits the public key and signature value of each of the at least one domain gateway to the vehicle manufacturer server, the vehicle manufacturer server may authenticate the at least one domain gateway based on the signature value of the at least one domain gateway. When authentication is completed, the vehicle manufacturer server may transmit a session key encrypted with the public key of the at least one domain gateway to the vehicle, and the vehicle may decrypt and store the session key and request and receive a security policy from the vehicle manufacturer server.

Here, the vehicle part replacement agreement procedure may include a process in which the maintenance terminal requests the vehicle diagnosis module to perform detailed inspection of the vehicle in response to a request from the terminal of the vehicle owner for inspection of the vehicle and a process in which the maintenance terminal asks the terminal of the vehicle owner whether to replace the vehicle part depending on the result of the detailed inspection of the vehicle.

Here, the authentication process may include a process in which the vehicle transmits the public key and signature value of the new part to the vehicle manufacturer server and a process in which the vehicle manufacturer server performs authentication of the new part based on the signature value of the new part.

Here, when the vehicle manufacturer server encrypts identification information of the new part with the session key and transmits the same to the vehicle along with the public key of the new part, the vehicle may update the session key based on the identification information of the new part, encrypt the updated session key with the public key of the new part, and transmit the same to the new part. The vehicle may encrypt a security policy stored in the at least one domain gateway with the updated session key and transmit the same to the new part.

Here, the terminal of the vehicle owner may compare a first integrity value received from the vehicle with a second integrity value received from the vehicle manufacturer server.

Here, the first integrity value may be acquired in such a way that the terminal of the vehicle owner again requests the vehicle diagnosis module to perform vehicle self-diagnosis after receiving the part replacement completion message, and the second integrity value may be acquired in such a way that the terminal of the vehicle owner requests the result of authentication of the new part from the vehicle manufacturer server after receiving the part replacement completion message.

BRIEF DESCRIPTION OF THE DRAWINGS

The above and other objects, features and advantages of the present invention will be more clearly understood from the following detailed description, taken in conjunction with the accompanying drawings, in which.

DESCRIPTION OF THE PREFERRED EMBODIMENTS

Figure 1:
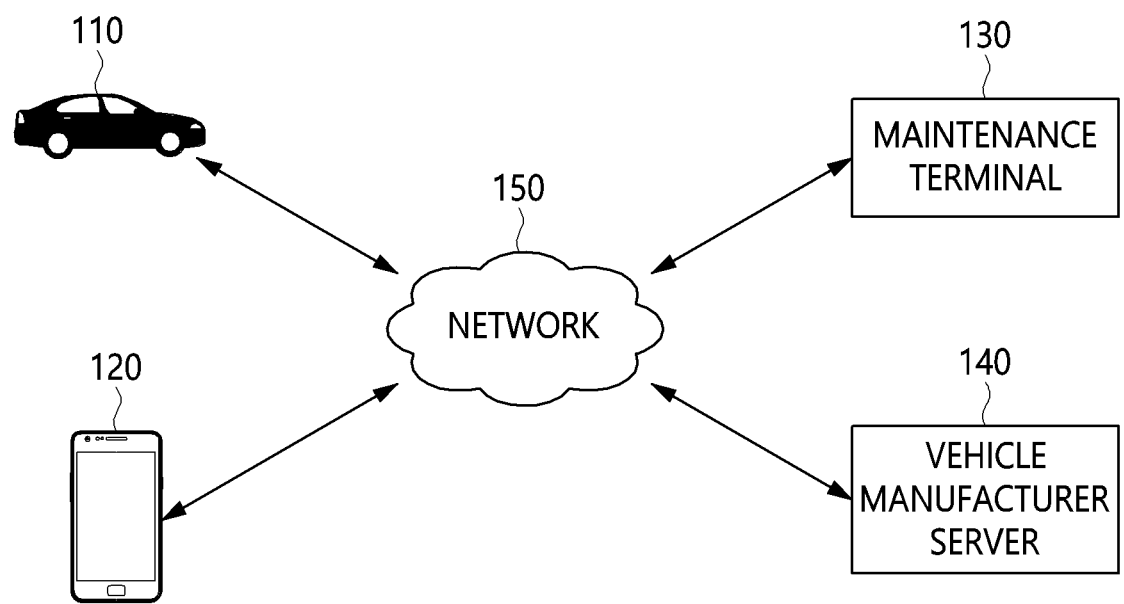
FIG. 1 is a view illustrating a system for replacing vehicle parts according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view illustrating a system for replacing vehicle parts according to an embodiment of the present invention.

Referring to FIG. 1, the system for replacing vehicle parts according to an embodiment of the present invention includes a vehicle 110, a vehicle owner's terminal 120, a maintenance terminal 130, and a vehicle manufacturer server 140.

Figure 2:
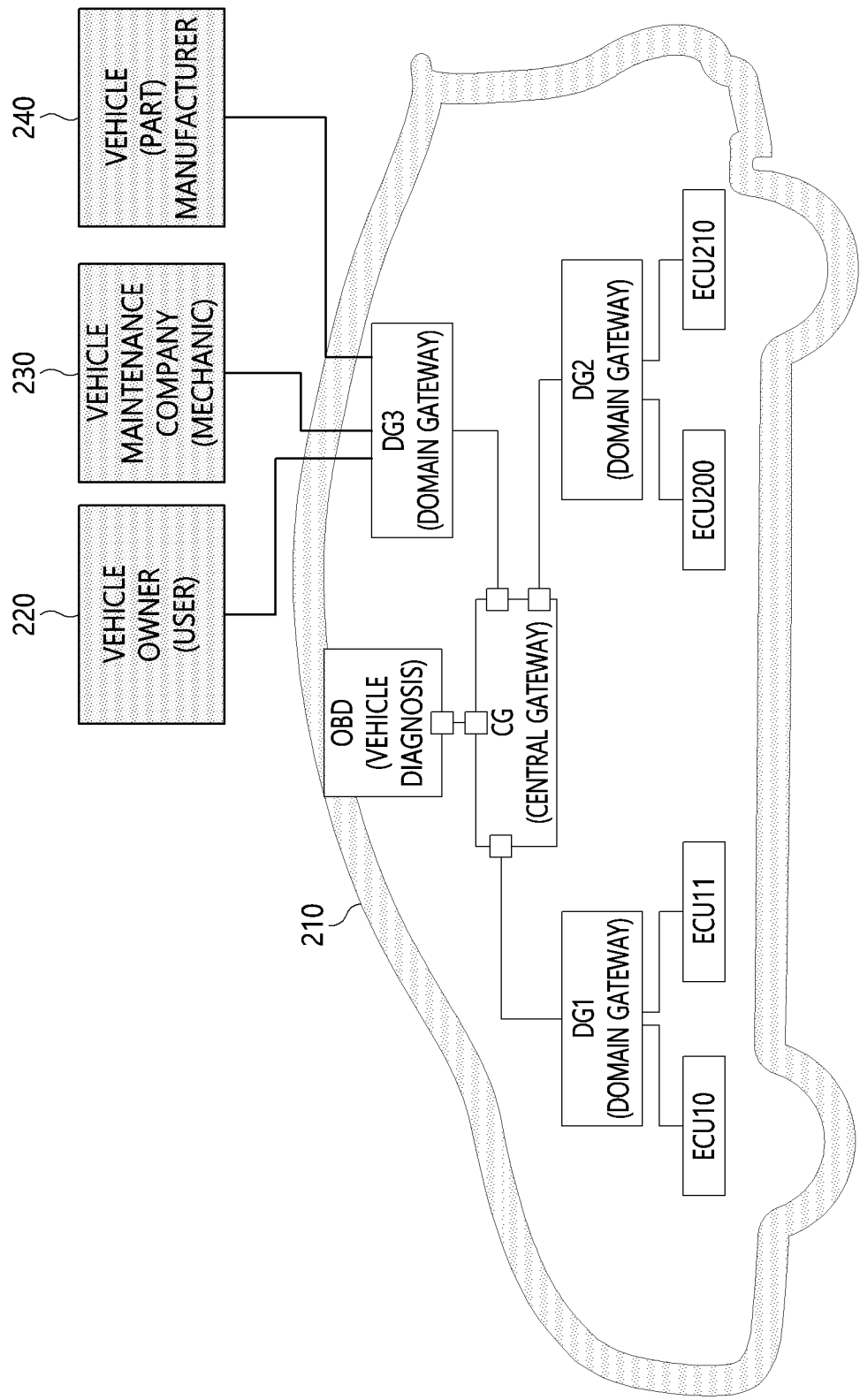
FIG. 2 is a view illustrating an example of an in-vehicle network based on an automotive Ethernet according to the present invention.

Here, as shown in FIG. 2, the vehicle 210 according to an embodiment of the present invention may be assumed to include three domain gateways, namely, a domain gateway1 DG1, a domain gateway2 DG2, and a domain gateway3 DG3, based on a central gateway CG.

Referring again to FIG. 2, the vehicle 210 may include the domain gateway1 DG1 and the domain gateway2 DG2 according to the functions and roles thereof, and ECUs corresponding to the respective domains may be connected therewith. Also, the domain gateway3 DG3 may serve to interface with the outside of the vehicle.

Here, the structure of the vehicle 210 illustrated in FIG. 2 is merely the internal structure of the vehicle corresponding to an embodiment for explaining the present invention, and various structures may be applied thereto depending on the vehicle design. For example, a domain gateway includes the functions of a central gateway, whereby only a single vehicle gateway may be configured, without the central gateway. Also, the vehicle may include a greater number of domain gateways than the number of domain gateways illustrated in FIG. 2.

Here, the OBD module included in the vehicle 210 may perform vehicle self-diagnosis in response to a request for self-diagnosis of the vehicle 210, and may transmit the result of the vehicle self-diagnosis to the outside via the domain gateway3.

Here, the vehicle owner 220 may request the vehicle 210 to perform vehicle self-diagnosis using his/her terminal 120 illustrated in FIG. 1, and may receive the result of the vehicle self-diagnosis using the same.

Here, when a fault is discovered in the result of the vehicle self-diagnosis, the vehicle owner may request a vehicle maintenance company 230 to carefully inspect the vehicle and to perform repair and maintenance thereof depending on the inspection result.

Here, the vehicle maintenance company 230 may carefully inspect the vehicle in response to the request from the vehicle owner 220, may perform vehicle repair and maintenance depending on the vehicle inspection result, and may transmit the vehicle repair and maintenance result to the vehicle owner 220.

Also, the vehicle manufacturer 240 may perform the process of registering and authenticating an ECU while communicating with the vehicle 210 over a network in the vehicle-manufacturing process or vehicle repair and maintenance process. For example, when the vehicle owner 220 requests confirmation of the vehicle repair and maintenance results from the vehicle manufacturer server 140 using his/her terminal 120, the vehicle manufacturer server 140 may transmit the results of vehicle repair and maintenance performed by the vehicle maintenance company 230 to the terminal 120 of the vehicle owner.

Here, the vehicle owner 220 may receive the vehicle repair and maintenance results from the vehicle manufacturer 240 using his/her terminal 120, such as a smartphone, based on an existing secure communication protocol.

Hereinafter, the process of replacing a vehicle part based on the vehicle 110, the terminal 120 of the vehicle owner, the maintenance terminal 130, and the vehicle manufacturer server 140 illustrated in FIG. 1 will be briefly described.

First, a vehicle diagnosis module included in the vehicle 110 performs vehicle self-diagnosis in response to a request made through the terminal 120 of the vehicle owner.

Here, the vehicle 110 may register at least one domain gateway included therein in the vehicle manufacturer server 140.

Here, the vehicle 110 may transmit the public key and signature value of each of the at least one domain gateway to the vehicle manufacturer server 140.

Here, the vehicle manufacturer server 140 may perform authentication of the at least one domain gateway based on the signature value thereof, and may transmit a session key encrypted with the public key of the at least one domain gateway to the vehicle 110 when authentication is completed.

Here, the vehicle 110 may decrypt the session key and store the same, and may request and receive security policies from the vehicle manufacturer server 140.

Also, when a vehicle part is replaced depending on the result of the vehicle self-diagnosis based on a vehicle part replacement agreement procedure between the terminal 120 of the vehicle owner and the maintenance terminal 130 of the vehicle maintenance company, the vehicle 110 and the vehicle manufacturer server 140 perform the process of authenticating a new part with which the vehicle part is replaced.

Here, the vehicle part replacement agreement procedure may include a process in which the maintenance terminal 130 requests the vehicle diagnosis module to carefully inspect the vehicle in response to a request from the terminal 120 of the vehicle owner to inspect the vehicle and a process in which the maintenance terminal 130 asks the terminal 120 of the vehicle owner whether to replace a vehicle part depending on the vehicle inspection result.

Here, the vehicle 110 may transmit the public key and signature value of a new part to the vehicle manufacturer server 140.

Here, the vehicle manufacturer server 140 may authenticate the new part based on the signature value thereof.

Here, the vehicle manufacturer server 140 may encrypt the identification information of the new part with a session key and transmit the same to the vehicle 110 along with the public key of the new part.

Here, the vehicle 110 may update the session key based on the identification information of the new part, encrypt the updated session key with the public key of the new part, and transmit the same to the new part.

Here, the vehicle 110 may encrypt security policies stored in the at least one domain gateway with the updated session key and transmit the same to the new part.

Also, when the maintenance terminal 130 transmits a part replacement completion message to the terminal 120 of the vehicle owner after completion of the authentication process, the terminal 120 of the vehicle owner requests an integrity check result from each of the vehicle 110 and the vehicle manufacturer server 140, thereby checking whether the vehicle part replacement has been performed normally.

Here, the terminal 120 of the vehicle owner may perform the integrity check by comparing a first integrity value received from the vehicle 110 with a second integrity value received from the vehicle manufacturer server 140.

Here, the first integrity value may be acquired in a manner in which the terminal 120 of the vehicle owner again requests the vehicle diagnosis module to perform vehicle self-diagnosis after it receives the part replacement completion message.

Here, the second integrity value may be acquired in a manner in which the terminal 120 of the vehicle owner requests the result of authentication of the new part from the vehicle manufacturer server 140 after it receives the part replacement completion message.

Through the above-described process, the vehicle part may be more securely replaced.

Figure 3:
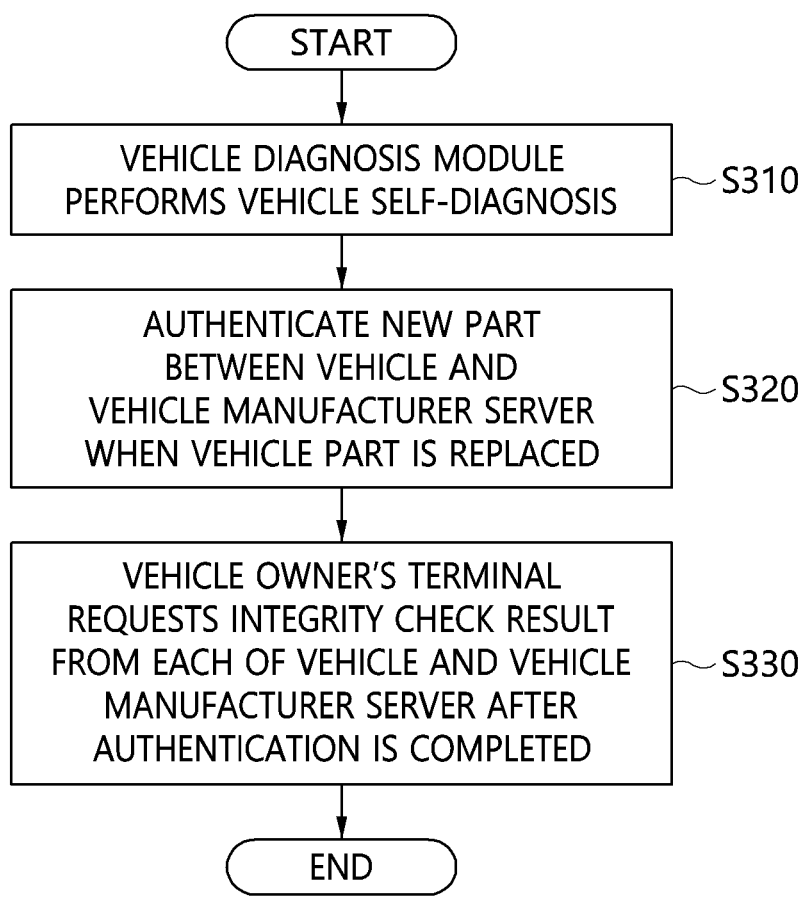
FIG. 3 is a flowchart illustrating a method for replacing vehicle parts according to an embodiment of the present invention.

FIG. 3 is a flowchart illustrating a method for replacing vehicle parts according to an embodiment of the present invention.

Referring to FIG. 3, in the method for replacing vehicle parts according to an embodiment of the present invention, a vehicle diagnosis module included in a vehicle performs vehicle self-diagnosis in response to a request made through the terminal of a vehicle owner at step S310.

Figure 4:
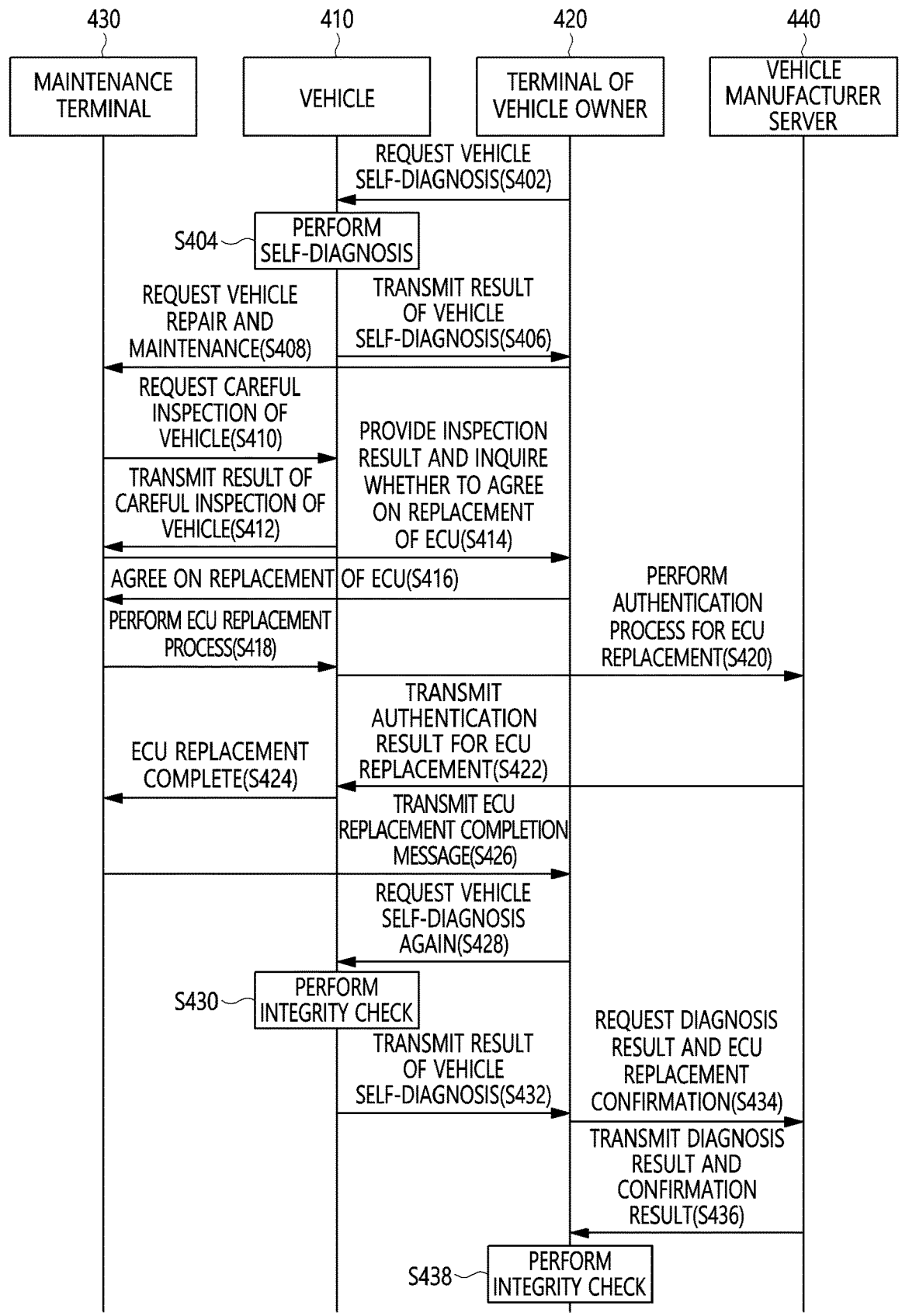
FIG. 4 is a view specifically illustrating the process of replacing a vehicle part according to an embodiment of the present invention.

For example, describing this process with reference to a specific vehicle part replacement process illustrated in FIG. 4, a vehicle owner may request a vehicle 410 to perform vehicle self-diagnosis through the terminal 420 of the vehicle owner at step S402 when a problem occurs in the vehicle during driving. Then, the vehicle 410 may perform self-diagnosis at step S404, and may return the result of the vehicle self-diagnosis to the terminal 420 of the vehicle owner at step S406.

Also, although not illustrated in FIG. 3, in the method for replacing vehicle parts according to an embodiment of the present invention, the vehicle may register at least one domain gateway included in the vehicle in a vehicle manufacturer server.

Here, the vehicle may transmit the public key and signature value of each of the at least one domain gateway to the vehicle manufacturer server.

Here, the vehicle manufacturer server may authenticate the at least one domain gateway based on the signature value thereof, and may transmit a session key encrypted with the public key of the at least one domain gateway to the vehicle when authentication is completed.

Here, the vehicle may decrypt the session key and store the same, and may request and receive security policies from the vehicle manufacturer server.

Figure 5:
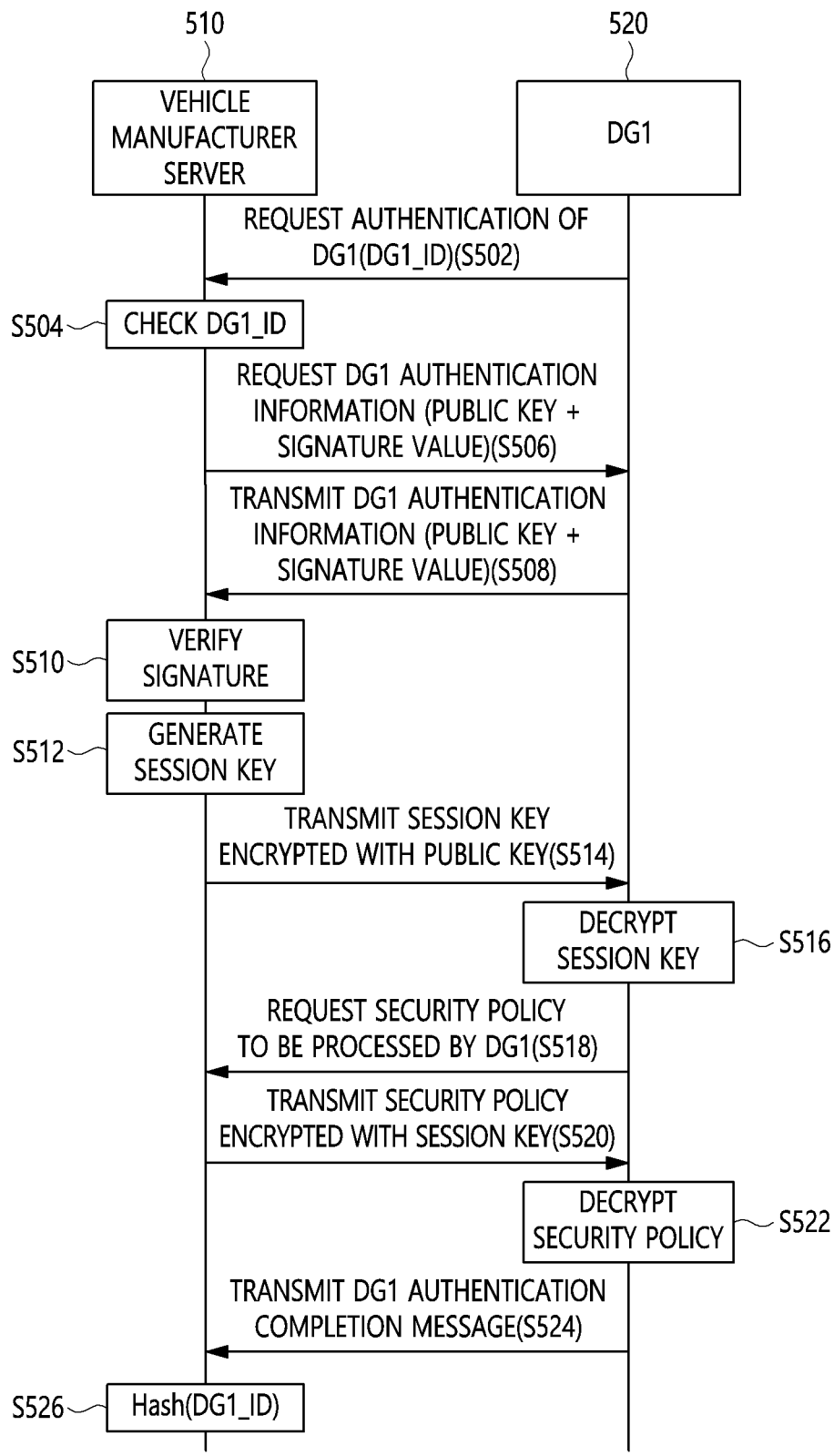
FIG. 5 is a view illustrating an example of a domain gateway authentication process in a method for replacing vehicle parts according to the present invention.

Hereinafter, the process of certifying the domain gateway1 520 of a vehicle and registering the same in a vehicle manufacturer server 510 when a vehicle manufacturer produces the vehicle using the domain gateway1 520 will be described in detail with reference to FIG. 5.

Here, the domain gateway1 520 is a vehicle part constituting the vehicle, and may be a product produced by the vehicle manufacturer or a third-party vehicle part manufacturer. Generally, a method in which the third-party vehicle part manufacturer supplies vehicle parts to the vehicle manufacturer is used. Accordingly, when the domain gateway1 520, which is a kind of vehicle part, is produced, public/private keys may be generated and embedded therein, and the digital signature value of the vehicle manufacturer for the public key may also be embedded therein. Here, the digital signature value embedded in the domain gateway1 520 may be used as authentication information for certification and registration when the vehicle manufacturer intends to use the required vehicle part in the process of manufacturing a vehicle.

Also, before the process of manufacturing a vehicle, the vehicle manufacturer server 510 may store information about a domain gateway capable of being registered in the corresponding vehicle and ECUs capable of being registered in the domain gateway, and the vehicle manufacturer server 510 may include the function of a key management server by storing the public/private keys.

Here, in addition to the vehicle manufacturer server 520, the domain gateway1 520 may securely store the private key using a hardware security module or a secure storage area, and may manage the private key so as to be prevented from being exposed outside.

Based on this process, the domain gateway1 520 may request authentication thereof from the vehicle manufacturer server 510 using the unique identification value DG1_ID thereof at step S502 in order to check whether registration thereof is possible.

Here, upon receiving an authentication request message for registration of the domain gateway1 520, the vehicle manufacturer server 510 checks DG1_ID, which is the unique identification value, at step S504, thereby checking whether the domain gateway1 520 is capable of being registered.

Then, when it is determined that the domain gateway1 520 is capable of being registered, the vehicle manufacturer server 510 may request authentication information corresponding to DG1_ID (that is, the public key of the domain gateway1 DG1 and the signature value of the vehicle manufacturer) from the domain gateway1 DG1 at step S506.

Then, when the domain gateway1 520 transmits the authentication information (the public key of DG1 and the signature value of the vehicle manufacturer) to the vehicle manufacturer server 510 at step S508, the vehicle manufacturer server 510 may certify the domain gateway1 through signature verification at step S510, and may generate a session key between the vehicle manufacturer and the domain gateway DG1 using DG1_ID information at step S512.

Then, the vehicle manufacturer server 510 may encrypt the generated session key with the public key of the domain gateway1 520 and transmit the same to the domain gateway1 520 at step S514.

Then, the domain gateway1 520 may decrypt the encrypted session key with the private key thereof and check the same at step S516.

Then, after it checks the session key, the domain gateway1 520 may request the security policies to process (ECU_IDs capable of being registered in DG1, the ID of the message to process, an access control policy, and the like) from the vehicle manufacturer server 510 at step S518.

Then, the vehicle manufacturer server 510 may encrypt the security policies to transmit to the domain gateway1 520 using the generated session key and transmit the same at step S520.

Upon receiving the message transmitted after being encrypted, the domain gateway1 520 may decrypt the encrypted message with the session key at step S522, may check the security policies to process, and may transmit a message announcing completion of authentication of DG1 to the vehicle manufacturer server 510 at step S524.

Here, upon receiving the authentication completion message, the vehicle manufacturer server 510 may calculate an integrity value using DG1_ID and securely store the same in the hardware security module or secure storage area at step S526.

Here, the integrity value may be calculated as a hash value using DG1_ID (Hash (DG1_ID)).

Also, in the method for replacing vehicle parts according to an embodiment of the present invention, when a vehicle part is replaced depending on the vehicle self-diagnosis result based on the vehicle part replacement agreement procedure between the terminal of the vehicle owner and the maintenance terminal of the vehicle maintenance company, the vehicle and the vehicle manufacturer server perform the process of authenticating a new part with which the vehicle part is replaced at step S320.

For example, describing this process with reference to FIG. 4, a vehicle owner may transmit a request for repair and maintenance of the vehicle 410 to the maintenance terminal 430 of the vehicle maintenance company at step S408 when a fault in a vehicle part, such as an ECU, is confirmed as the result of the vehicle self-diagnosis.

Here, the vehicle part replacement agreement procedure may include a process in which the maintenance terminal requests the vehicle diagnosis module to carefully inspect the vehicle in response to a request from the terminal of the vehicle owner for inspection of the vehicle and a process in which the maintenance terminal asks the terminal of the vehicle owner whether to replace the vehicle part depending on the result of careful inspection of the vehicle.

For example, describing the same with reference to FIG. 4, the maintenance terminal 430 of the vehicle maintenance company may request the vehicle diagnosis module included in the vehicle 410 to carefully inspect the vehicle at step S410. Then, whether the vehicle part is actually defective may be checked by receiving the vehicle inspection result from the vehicle 410. Then, when a fault in the vehicle part is confirmed as checked through the vehicle self-diagnosis result, the maintenance terminal 430 may ask the vehicle owner whether to replace the defective vehicle part (ECU) by transmitting the vehicle inspection result to the vehicle owner through the terminal 420 of the vehicle owner at step S414. Then, the maintenance terminal 430 receives consent to the replacement of the vehicle part from the terminal 420 of the vehicle owner at step S416, and may replace the part (ECU) of the vehicle 410 at step S418.

Here, the vehicle maintenance company, which serves to replace the vehicle part, does not have to be additionally concerned with the process of replacing the defective vehicle part with a new part. That is, the vehicle maintenance company only has to connect the new ECU, to which the vehicle owner gives consent, with the vehicle in a hardware manner in place of the defective ECU, and the ECU replacement process may be performed through the authentication process (S420 and S422) between the vehicle 410 and the vehicle manufacturer server 440. Here, the vehicle maintenance company only needs to check the result.

Figure 6:
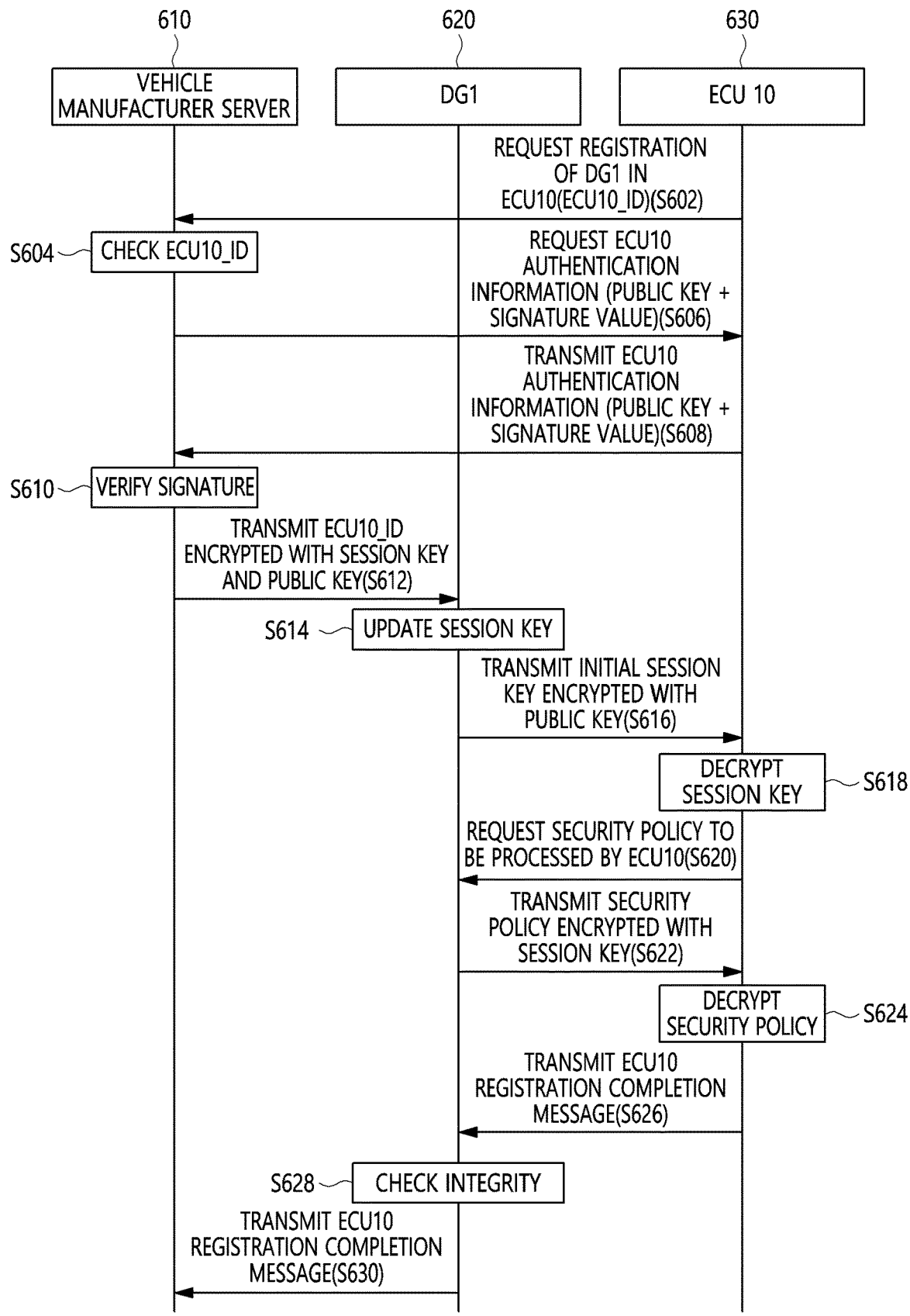
FIG. 6 is a view illustrating an example of a vehicle part registration process in a method for replacing vehicle parts according to the present invention.

Here, the existing ECU installed in the vehicle is installed after being authenticated and registered in the domain gateway in the process of manufacturing the vehicle, and this process will be described in detail with reference to FIG. 6.

For example, because an ECU10 630 is the ECU to be registered in a domain gateway1 620 during a vehicle-manufacturing process, DG1_ID and ECU10_ID of the ECU10 630 are transmitted to a vehicle manufacturer server 610 in order to authenticate the ECU10 630 and register the same in the domain gateway1 620, whereby registration of the ECU10 630 in the domain gateway1 620 may be requested at step S602.

Here, the domain gateway1 620 and the ECU10 630 are vehicle parts constituting the vehicle, and may be products produced by the vehicle manufacturer or a third-party vehicle part manufacturer. Accordingly, when the domain gateway1 620 or the ECU10 630, which are kinds of vehicle parts, is produced, public/private keys of each of the domain gateway1 and the ECU10 may be generated and embedded therein, and the digital signature value (OEM signature value) of the vehicle manufacturer for the public key may also be embedded. Here, the digital signature value embedded in each of the domain gateway1 620 and the ECU10 630 may be used as authentication information for certification and registration when the vehicle manufacturer intends to use the required vehicle part in the vehicle-manufacturing process.

Then, the vehicle manufacturer server 610 may check whether the ECU10 630 is capable of being registered at step S604 by checking the received ECU10_ID, and may request authentication information corresponding to the ECU10_ID (the public key of the ECU10 and the signature value of the vehicle manufacturer) from the ECU10 630 at step S606 when it is determined that registration of the ECU10 is possible.

Then, the vehicle manufacturer server 610 may receive the authentication information (the public key of the ECU10 and the signature value of the vehicle manufacturer) from the ECU10 630 at step S608, and may certify the ECU10 630 through signature verification at step S610.

Then, the vehicle manufacturer server 610 may encrypt the ECU10_ID information with the session key shared with the domain gateway1 620 and transmit the same to the domain gateway1 620 along with the public key of the ECU10 630 at step S612.

Then, the domain gateway1 620 may check the ECU10_ID, which is decrypted using the session key, and may update the session key using the checked information, thereby generating an initial session key for the ECU10 630 at step S614.

Here, the initial session key may be alternatively generated using information about all of the registered ECUs after all of the ECUs to be registered in the domain gateway1 620 have been registered therein. That is, all of the ECUs connected with the domain gateway1 620 are forced to use the same session key, whereby the key management burden imposed on the domain gateway1 620 may be reduced.

The initial session key generated as described above may be encrypted with the public key of the ECU10 630 that made the request for registration thereof, and may be transmitted to the ECU10 630 at step S616.

Then, the ECU10 630 may decrypt the session key, which is encrypted with the public key thereof, with the private key thereof, thereby checking the session key at step S618.

Then, after it checks the session key, the ECU10 630 may request security policies (the ID of the message to process, an access control policy, and the like) from the domain gateway1 620 at step S620, and the domain gateway1 620 may encrypt the security policies to be processed by the ECU10 630 with the generated initial session key and transmit the same to the ECU10 at step S622.

Then, the ECU10 630 may decrypt the encrypted message with the previously received initial session key, and may check and apply the security policies to be processed thereby at step S624.

Then, when the ECU10 630 transmits a registration completion message to the domain gateway1 620 at step S626, the domain gateway1 620 may receive the registration completion message, calculate an integrity value (hash value) based on the priority of the ECU_ID registered in the domain gateway1 620, and store the same at step S628.

Here, the integrity value may be calculated as a hash value using the DG1_ID (Hash (DG1_ID)) and a hash value using the ECU10_ID (Hash (Hash (DG1_ID)∥ECU10_ID)).

Then, the domain gateway1 620 may transmit a message announcing completion of registration of the ECU10 to the vehicle manufacturer server 610 at step S630.

Here, upon receiving the registration completion message, the vehicle manufacturer server 610 may calculate an integrity value (hash value) using the same method as in the domain gateway1 620 and store the same, thereby completing registration of the ECU10 630 in the domain gateway1 620.

Also, in the present invention, a new part may be authenticated and registered in the domain gateway through a vehicle part replacement process.

Here, the vehicle may transmit the public key and signature value of the new part to the vehicle manufacturer server.

Here, the vehicle manufacturer server may authenticate the new part based on the signature value thereof.

Here, the vehicle manufacturer server may encrypt the identification information of the new part with a session key and transmit the same to the vehicle along with the public key of the new part.

Here, the vehicle may update the session key based on the identification information of the new part, encrypt the updated session key with the public key of the new part, and transmit the same to the new part.

Here, the vehicle may encrypt the security policies stored in the at least one domain gateway with the updated session key and transmit the same to the new part.

Hereinafter, this process will be described in detail with reference to FIG. 7.

Figure 7:
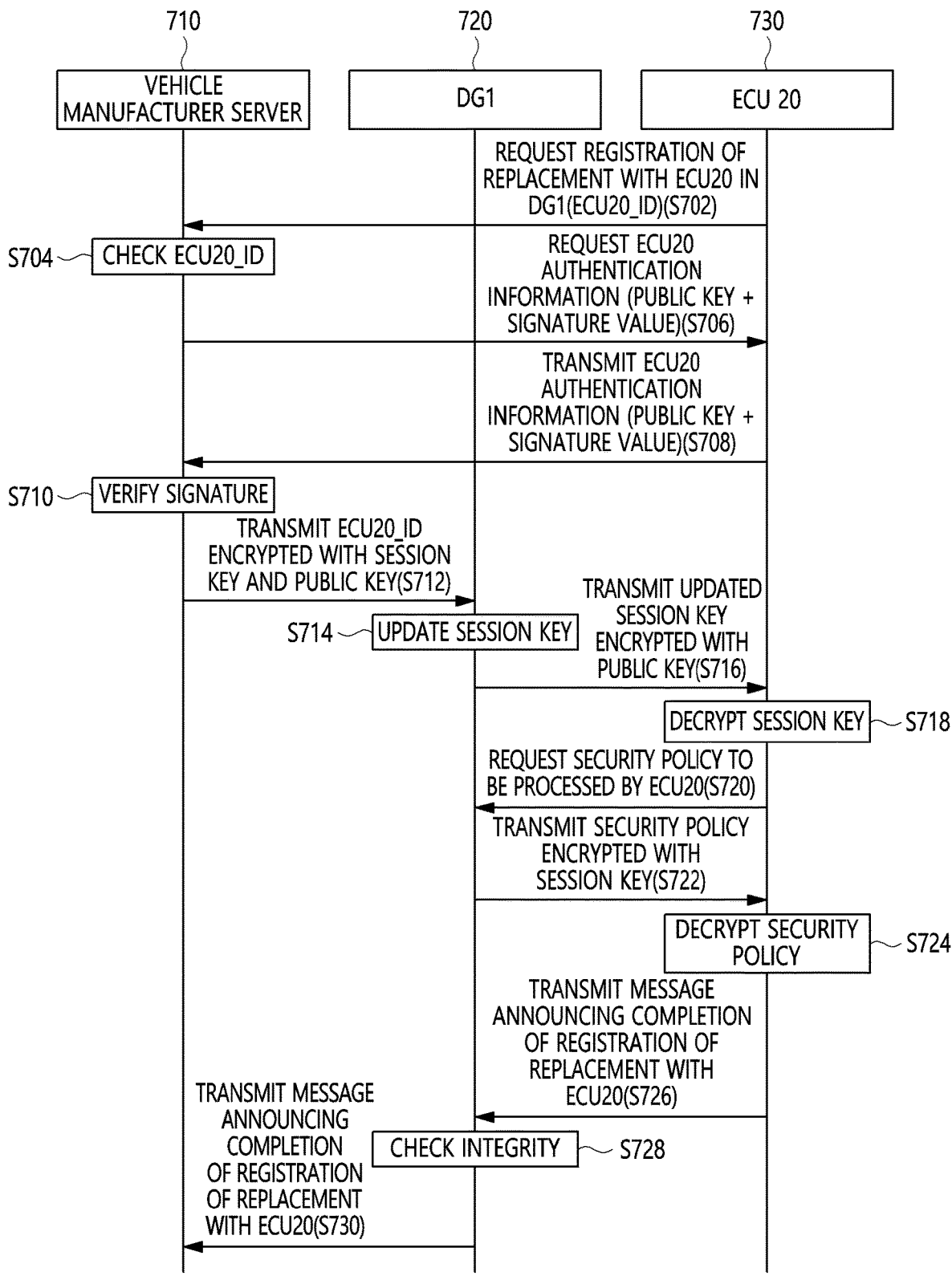
FIG. 7 is a view illustrating an example of the process of registering replacement with a new vehicle part in a method for replacing vehicle parts according to the present invention.

Here, the ECU20 730 illustrated in FIG. 7 is the new ECU to be registered as the ECU to replace the ECU10, which has been registered in the domain gateway1 720 in the vehicle-manufacturing process as described with reference to FIG. 6.

Here, the domain gateway1 720 and the ECU20 730 are vehicle parts constituting a vehicle, and may be products produced by a vehicle manufacturer or a third-party vehicle part manufacturer. Therefore, when the domain gateway1 or the ECU20 730, which are vehicle parts, is produced, public/private keys for each of the domain gateway1 and the ECU20 may be generated and embedded therein, and a digital signature value (OEM signature value) of the vehicle manufacturer for the public key may also be embedded.

Here, the digital signature value embedded in each of the domain gateway1 720 and the ECU20 730 may be used as authentication information for certification and registration when the vehicle manufacturer intends to use the required vehicle part in the vehicle-manufacturing process.

Here, the ECU20 730 transmits identification information DG1_ID of the domain gateway1 720, information (ECU10_ID) about the ECU10 that is required to be replaced, and information (ECU20_ID) about the ECU20, which is a new part to replace the ECU10, to the vehicle manufacturer server 710, thereby requesting registration of the new ECU so as to replace the ECU registered in the domain gateway1 720 at step S702.

Then, the vehicle manufacturer server 710 may check whether the ECU20 730 is capable of being registered at step S704 by checking the ECU20_ID, and may request authentication information corresponding to the ECU20_ID (the public key of the ECU20 and the signature value of the vehicle manufacturer) at step S706 when it is determined that registration of the ECU20 is possible.

Here, when the ECU20 730 transmits the authentication information (the public key of the ECU20 and the signature value of the vehicle manufacturer) to the vehicle manufacturer server 710 at step S708, the vehicle manufacturer server 710 may certify the ECU20 730 through signature verification at step S710.

Then, the vehicle manufacturer server 710 may encrypt information corresponding to ECU10_ID∥ECU20_ID using the session key shared with the domain gateway1 720 and transmit the same to the domain gateway1 720 along with the public key of the ECU20 730 at step S712.

Then, the domain gateway1 720 may check the ECU20_ID of the ECU that requests registration thereof so as to replace the old ECU by performing decryption with the session key, and may update the session key using the checked ECU20_ID at step S714.

Here, the session key may be alternatively updated using information about all of the ECUs that have been registered in the domain gateway1 720, including the ECU20 730 newly registered in the domain gateway1 720 through replacement. Through this process, all of the ECUs connected with the domain gateway1 720 are forced to use the same new session key, whereby the key management burden imposed on the domain gateway1 720 and a security threat of leakage of the existing session key may be reduced.

Then, the domain gateway1 720 may encrypt the updated session key with the public key of the ECU20 730 and transmit the same to the ECU20 730 at step S716.

Then, the ECU20 730 may decrypt the encrypted session key with the private key thereof, thereby checking the updated session key at step S718.

Then, after it checks the updated session key, the ECU20 730 may request security policies (the ID of the message to process, an access control policy, and the like) from the domain gateway1 720 at step S720.

Then, the domain gateway1 720 may encrypt the security policies to be processed by the ECU20 730 with the updated new session key and transmit the same to the ECU20 730 at step S722.

Then, the ECU20 730 may decrypt the encrypted message with the updated session key received from the domain gateway1 720 at step S724, thereby checking and applying the security policies to be processed by the ECU20 730.

Then, the ECU20 730 may transmit a replacement registration completion message, announcing completion of registration for replacement with the ECU20, to the domain gateway1 720 at step S726.

Then, after it receives the replacement registration completion message, the domain gateway1 720 may calculate an integrity value (hash value) based on the priority of the ECU_ID registered in the domain gateway1 720 and store the same at step S728.

Here, the integrity value may be calculated as a hash value using the DG1_ID (Hash (DG1_ID)), a hash value using the ECU10_ID (Hash (Hash (DG1_ID)||ECU10_ID)), and a hash value using the ECU20_ID (Hash (Hash (Hash (DG1_ID)||ECU10_ID)||ECU20_ID)).

Then, the domain gateway1 720 may transmit the message announcing completion of registration of the ECU20 to the vehicle manufacturer server 710 at step S730.

Here, upon receiving the message announcing completion of registration of the ECU20, the vehicle manufacturer server 710 may calculate an integrity value (hash value) using the same method as in the domain gateway1 720 and store the same, thereby completing registration of the ECU20 in the domain gateway1 720 for replacement.

Also, in the method for replacing vehicle parts according to an embodiment of the present invention, when the maintenance terminal transmits a part replacement completion message to the terminal of the vehicle owner after completion of the authentication process, the terminal of the vehicle owner requests an integrity check result from each of the vehicle and the vehicle manufacturer server, thereby checking whether replacement of the vehicle part is performed normally at step S330.

For example, describing this process with reference to FIG. 4, when replacement with the ECU, corresponding to a new part, has been completed normally in the vehicle 410 at step S424, the maintenance terminal 430 may transmit a part replacement completion message (ECU replacement completion message) to the terminal 420 of the vehicle owner at step S426.

Here, the vehicle maintenance company may check once more whether the vehicle 410 is in a normal state by carefully inspecting the vehicle again, and may then transmit the ECU replacement completion message to the vehicle owner.

Here, the terminal of the vehicle owner may perform the integrity check by comparing a first integrity value received from the vehicle with a second integrity value received from the vehicle manufacturer server.

Here, the first integrity value may be acquired in such a way that the terminal of the vehicle owner again requests the vehicle diagnosis module to perform vehicle self-diagnosis after it receives the part replacement completion message.

For example, describing this process with reference to FIG. 4, after it receives the ECU replacement completion message from the maintenance terminal 430 of the vehicle maintenance company, the terminal 420 of the vehicle owner may again request the vehicle 410 to perform vehicle self-diagnosis at step S428. Then, the terminal 420 of the vehicle owner may receive the integrity value, generated through the vehicle self-diagnosis performed by the vehicle 410, along with the result of the vehicle self-diagnosis at steps S430 and S432.

Here, the second integrity value may be acquired in such a way that the terminal of the vehicle owner requests the result of authentication of the new part from the vehicle manufacturer server after it receives the part replacement completion message.

For example, describing this process with reference to FIG. 4, the terminal 420 of the vehicle owner may request confirmation of ECU replacement from the vehicle manufacturer server 440 at step S434, and may receive the integrity value generated after replacement of the ECU from the vehicle manufacturer server 440 at step S436.

Accordingly, when the integrity value received from the vehicle 410 through the terminal 420 of the vehicle owner and the integrity value received from the vehicle manufacturer server 440 through the terminal 420 of the vehicle owner are the same as each other, the vehicle owner may confirm that the ECU has been securely replaced with a certified ECU. If the two integrity values received from the vehicle 410 and the vehicle manufacturer server 440 are different from each other, it may be confirmed that the new ECU is not a genuine product but an uncertified ECU.

Using the above-described vehicle part replacement method, maintenance of a vehicle and replacement of vehicle parts may be more securely performed, and there is an effect of assuredly preventing an uncertified vehicle part from being connected with the vehicle.

Also, the vehicle domain gateway is forced to manage security policies for different ECUs connected with the same domain, whereby the load imposed when all of vehicle parts (ECUs) have to be connected with the vehicle manufacturer server may be minimized.

Also, because the ECUs connected with the same domain in the vehicle are forced to use the same session key (secret key), there is an effect of minimizing the burden of the vehicle domain gateway that manages keys for all of the ECUs connected with the same domain.

Also, the session key used for communication with the ECUs connected with the domain is based on the initial session key that is generated when an ECU is registered or when an ECU is registered for replacement, but each time communication is required, a newly updated session key is used, whereby a secure communication channel may be provided in the vehicle.

Figure 8:
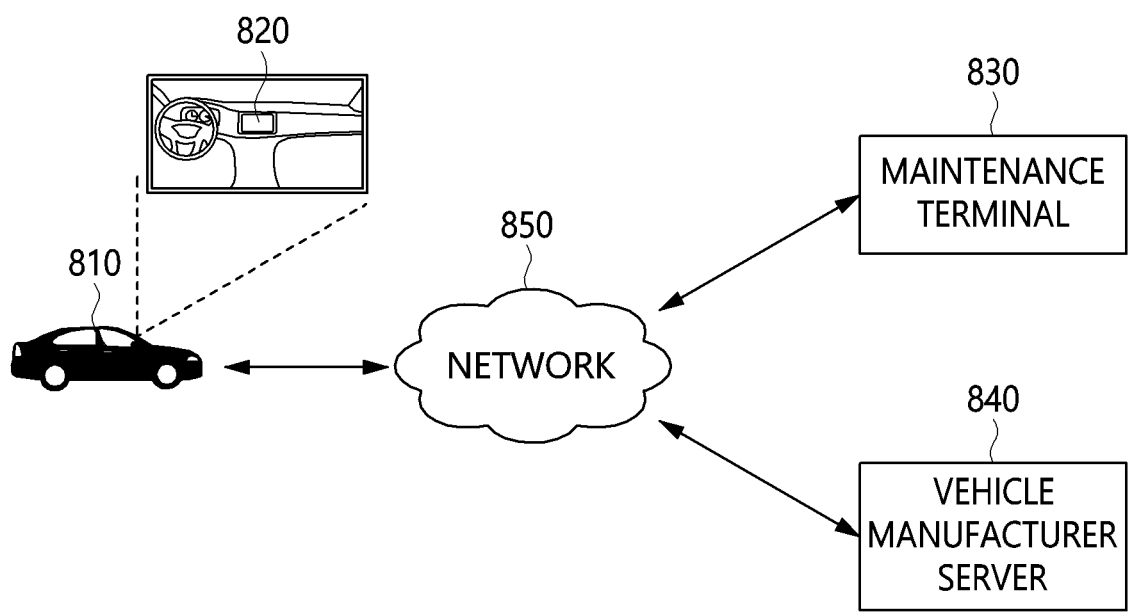
FIG. 8 is a view illustrating a system for replacing vehicle parts according to another embodiment of the present invention.

FIG. 8 is a view illustrating a system for replacing vehicle parts according to another embodiment of the present invention.

Referring to FIG. 8, the system for replacing vehicle parts according to another embodiment of the present invention includes a vehicle 810, a display terminal 820 in the vehicle, which takes the role of the vehicle owner's terminal 120 illustrated in FIG. 1, a maintenance terminal 830, and a vehicle manufacturer server 840.

Here, the system for replacing vehicle parts illustrated in FIG. 8 may provide a vehicle self-diagnosis result, the result of replacement of a vehicle part, or the result of vehicle repair and maintenance to the vehicle owner using the display terminal 820 in the vehicle, rather than using the vehicle owner's terminal in the form of a mobile terminal in FIG. 1.

Here, the system structure illustrated in FIG. 8 includes the display terminal 820 in the vehicle, which can be provided separately from the vehicle owner's terminal 120 illustrated in FIG. 1, when it is assumed that the vehicle owner is inside the vehicle 810, and the display terminal 820 may be, for example, a display device built into the vehicle, such as a digital cluster, a head unit, an infotainment device, or the like.

For example, the display terminal 820 in the vehicle may be supplied with power from the vehicle 810, and may communicate with the vehicle 810, the maintenance terminal 830, and the vehicle manufacturer server 840 using an in-vehicle network of the vehicle 810 or a network 850 outside the vehicle 810.

That is, even though the vehicle owner does not use a separate mobile terminal, the vehicle owner may request vehicle self-diagnosis by manipulating the display terminal 820 provided in the vehicle 810, and may check the diagnosis result or the result of vehicle part replacement or vehicle repair and maintenance using the display terminal 820.

According to the present invention, a system for more securely repairing a vehicle and replacing vehicle parts may be provided by applying IT technology to a process in which a vehicle maintenance company carefully inspects and repairs the vehicle.

Also, the present invention prevents installation of an uncertified part in a vehicle through the process of registering a certified genuine part, which is performed between a vehicle manufacturer and a vehicle part manufacturer, thereby fundamentally preventing the uncertified vehicle part from being connected with the vehicle.

Also, the present invention may provide a vehicle part replacement method that can be trusted by a vehicle owner by enabling the vehicle owner to check information about a new vehicle part (ECU), with which an old vehicle part is replaced, and to additionally check the result of replacement.

Also, the present invention may minimize a key management burden imposed on a domain gateway by forcing ECUs connected with the same domain in a vehicle to use the same session key (secret key).

Also, the present invention may construct a secure communication channel in a vehicle using a session key that is based on an initial session key and is updated each time communication is required, the initial session key being generated when an ECU is registered or when a new ECU to replace an old ECU is registered.

As described above, the method for replacing vehicle parts using an in-vehicle network based on an automotive Ethernet and system therefor according to the present invention are not limitedly applied to the configurations and operations of the above-described embodiments, but all or some of the embodiments may be selectively combined and configured, so the embodiments may be modified in various ways.

What is claimed is:

1. A method for replacing vehicle parts, based on communication between a vehicle processor, a terminal processor of a vehicle owner, a maintenance terminal processor of a vehicle maintenance company, and a vehicle manufacturer server processor, comprising:

performing, by a vehicle diagnosis module included in a vehicle processor, vehicle self-diagnosis in response to a request made through a terminal processor of a vehicle owner;

performing, by the vehicle processor and a vehicle manufacturer server processor, an authentication process for a new part with which a vehicle part is replaced when the vehicle part is replaced depending on a result of the vehicle self-diagnosis based on a vehicle part replacement agreement procedure between the terminal processor of the vehicle owner and a maintenance terminal processor of a vehicle maintenance company;

checking, by the terminal processor of the vehicle owner, whether replacement of the vehicle part is performed normally by requesting an integrity check result from each of the vehicle and the vehicle manufacturer server processor when the maintenance terminal processor transmits a part replacement completion message to the terminal processor of the vehicle owner after the authentication process is completed; and registering, by the vehicle processor, at least one domain gateway included in the vehicle in the vehicle manufacturer server processor, wherein checking whether the replacement of the vehicle part is performed normally is configured such that the terminal processor of the vehicle owner compares a first integrity value received from the vehicle processor with a second integrity value received from the vehicle manufacturer server processor, wherein the vehicle part replacement agreement procedure includes a process in which the maintenance terminal processor requests the vehicle diagnosis module to perform detailed inspection of the vehicle in response to a request from the terminal processor of the vehicle owner for inspection of the vehicle, a process in which the maintenance terminal processor asks the terminal processor of the vehicle owner whether to replace the vehicle part depending on a result of the detailed inspection of the vehicle, and a process in which the maintenance terminal processor receives consent to the replacement of the vehicle part from the terminal processor of the vehicle owner, wherein registering the at least one domain gateway includes:
  transmitting, by the vehicle processor, a public key and signature value of each of the at least one domain gateway to the vehicle manufacturer server processor;
  authenticating, by the vehicle manufacturer server processor, the at least one domain gateway based on the signature value thereof, and transmitting, by the vehicle manufacturer server processor, a session key encrypted with the public key of the at least one domain gateway to the vehicle when authentication is completed; and
  decrypting and storing, by the vehicle processor, the session key, and requesting and receiving, by the vehicle processor, a security policy from the vehicle manufacturer server processor, wherein performing the authentication process comprises:
  transmitting, by the vehicle processor, a public key and signature value of the new part to the vehicle manufacturer server processor; and
  performing, by the vehicle manufacturer server processor, authentication of the new part based on the signature value of the new part, wherein the vehicle manufacturer server processor encrypts identification information of the new part with the session key and transmits the encrypted identification information to the vehicle along with the public key of the new part, wherein the vehicle processor updates the session key based on the identification information of the new part, encrypts the updated session key with the public key of the new part, and transmits the encrypted session key, to the new part, and wherein the vehicle processor encrypts a security policy stored in the at least one domain gateway with the updated session key and transmits the encrypted security policy to the new part.

2. The method of claim 1, wherein:

the first integrity value is acquired in such a way that the terminal processor of the vehicle owner again requests the vehicle diagnosis module to perform vehicle self-diagnosis after receiving the part replacement completion message, and the second integrity value is acquired in such a way that the terminal processor of the vehicle owner requests a result of authentication of the new part from the vehicle manufacturer server processor after receiving the part replacement completion message.

3. A system for replacing vehicle parts, based on communication between a vehicle processor, a terminal processor of a vehicle owner, a maintenance terminal processor of a vehicle maintenance company, and a vehicle manufacturer server processor, comprising:

a vehicle processor performing vehicle self-diagnosis based on a vehicle diagnosis module included in the vehicle processor;

a terminal processor of a vehicle owner for requesting the vehicle to perform the vehicle self-diagnosis;

a maintenance terminal processor of a vehicle maintenance company for inspecting the vehicle and replacing a vehicle part in response to a request from the terminal processor of the vehicle owner; and a vehicle manufacturer server processor for performing an authentication process for a new part with which the vehicle part is replaced based on communication of the vehicle processor when the vehicle part is replaced depending on a result of the vehicle self-diagnosis based on a vehicle part replacement agreement procedure between the terminal processor of the vehicle owner and the maintenance terminal processor, wherein the terminal processor of the vehicle owner checks whether replacement of the vehicle part is performed normally by requesting an integrity check result from each of the vehicle processor and the vehicle manufacturer server processor when the terminal processor of the vehicle owner receives a part replacement completion message from the maintenance terminal processor after completion of the authentication process, wherein the vehicle processor registers at least one domain gateway included in the vehicle in the vehicle manufacturer server processor, wherein the terminal processor of the vehicle owner compares a first integrity value received from the vehicle processor with a second integrity value received from the vehicle manufacturer server processor, wherein the vehicle part replacement agreement procedure includes a process in which the maintenance terminal processor requests the vehicle diagnosis module to perform detailed inspection of the vehicle in response to a request from the terminal processor of the vehicle owner for inspection of the vehicle, a process in which the maintenance terminal processor asks the terminal processor of the vehicle owner whether to replace the vehicle part depending on a result of the detailed inspection of the vehicle, and a process in which the maintenance terminal processor receives consent to the replacement of the vehicle part from the terminal processor of the vehicle owner, wherein registering the at least one domain gateway includes:

when the vehicle processor transmits a public key and signature value of each of the at least one domain gateway to the vehicle manufacturer server processor, the vehicle manufacturer server processor authenticates the at least one domain gateway based on the signature value of the at least one domain gateway, and when authentication is completed, the vehicle manufacturer server processor transmits a session key encrypted with the public key of the at least one domain gateway to the vehicle processor, the vehicle processor decrypts and stores the session key and requests and receives a security policy from the vehicle manufacturer server processor, the vehicle processor transmits a public key and signature value of the new part to the vehicle manufacturer server processor; and the vehicle manufacturer server processor performs authentication of the new part based on the signature value of the new part, and wherein the vehicle manufacturer server processor encrypts identification information of the new part with the session key and transmits the encrypted identification information to the vehicle along with the public key of the new part, wherein the vehicle processor updates the session key based on the identification information of the new part, encrypts the updated session key with the public key of the new part, and transmits the encrypted session key, to the new part, and wherein the vehicle processor encrypts a security policy stored in the at least one domain gateway with the updated session key and transmits the encrypted security policy to the new part.

* * * * *